May 31, 1960 — A. D. GILCHRIST — 2,939,021
ELECTRIC GENERATORS
Filed Sept. 3, 1957 — 2 Sheets-Sheet 1

INVENTOR.
ALBERT D. GILCHRIST
BY Hudson, Coughton,
Williams, David & Hoffman
ATTORNEYS May 31, 1960

A. D. GILCHRIST 2,939,021

ELECTRIC GENERATORS

Filed Sept. 3, 1957

INVENTOR.
ALBERT D. GILCHRIST
BY Hudson Boughton
Williams, David & Hoffmann
ATTORNEYS United States Patent Office 2,939,021
Patented May 31, 1960

2,939,021
ELECTRIC GENERATORS

Albert D. Gilchrist, Rocky River, Ohio, assignor to The Leece-Neville Company, Cleveland, Ohio, a corporation of Ohio Filed Sept. 3, 1957, Ser. No. 681,608

2 Claims. (Cl. 310—42)

This invention relates to electric generators and provides a novel stator construction for the same.

An object of this invention is to provide a novel construction for an electrical machine of the kind having a laminated stator core disposed between a pair of end members, and in which members extending through the laminations have projecting ends forming locating elements on the core for mating engagement with locating elements on the end members.

Another object is to provide a novel construction for such an electrical machine in which the locating elements of the end members are recesses thereon and in which the locating elements of the core are projecting ends of hollow members extending through the laminations, the end members being held in clamping engagement with the core by connecting rods extending through the hollow members.

Still another object is to provide a novel stator construction for an electric generator or the like in which retaining members extending through the laminations of the stator core have riveted end portions, and in which locating elements on the ends of the core are formed by portions of the retaining members projecting beyond the riveted portions thereof.

Additionally, this invention provides an electric generator embodying the novel stator construction above referred to and in which arm projections carried by end members of the stator are positioned in a desired aligned relation by the mating cooperation of the locating elements of the end members and core.

Other objects and advantages of this invention will be apparent in the following detailed description and in the accompanying drawings forming a part of the present specification and in which, Fig. 1 is a longitudinal section taken through an electrical generator embodying the present invention;

Figure 1:
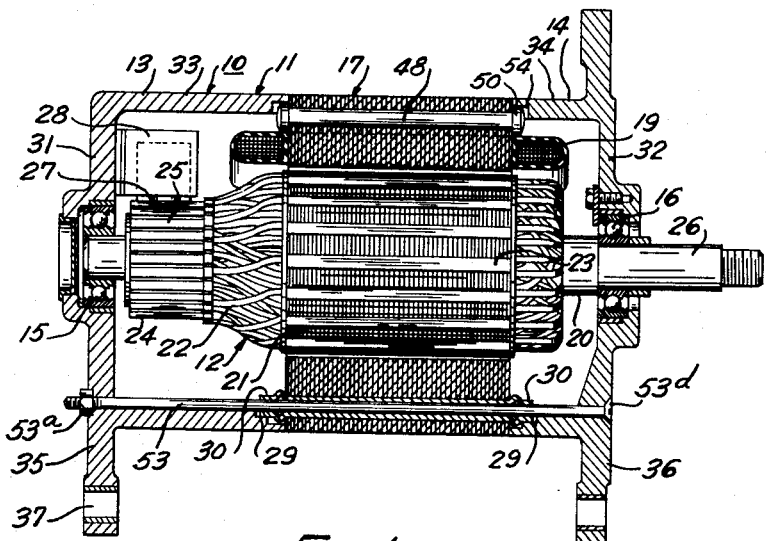
Figures 2, 3:
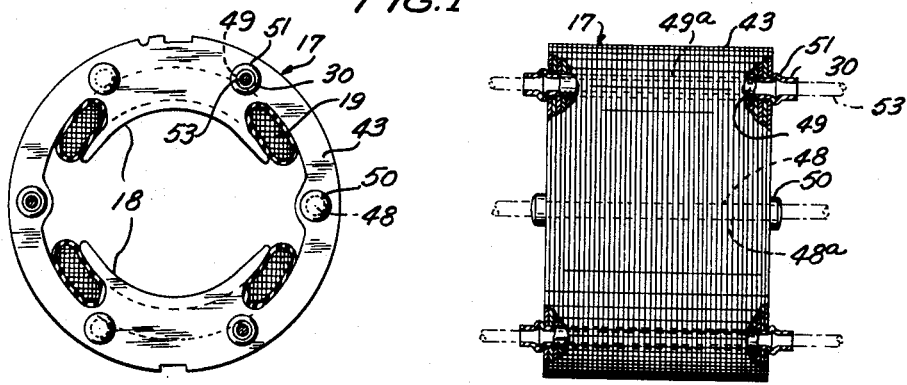
Fig. 2 is a side elevation of the stator core in detached relation and with portions thereof broken away.
Fig. 3 is an end elevation of the stator core with the coils thereof shown in cross-section.

As one practical embodiment of the present invention, Fig. 1 shows an electrical machine 10 which, in this case, is a direct-current generator comprising cooperating stator and rotor members 11 and 12. The stator or field member 11 comprises a pair of end members 13 and 14 having substantially aligned antifriction bearings 15 and 16 therein, and a laminated core 17 disposed between and clampingly engaged by the end members. The core 17 includes pole portions 18 having stator windings 19 thereon. The rotor or armature 12 comprises a shaft 20 supported in the bearings 15 and 16, and a laminated rotor core 21 mounted on the shaft and carrying rotor windings 22 located in slots 23. The rotor 12 also comprises a commutator 24 having its segments 25 connected with the rotor windings 22.

The shaft 20 has an end portion 26 projecting beyond the bearing 16 and the rotor 12 is adapted to be driven by torque suitably applied to this projecting shaft portion. Suitable brushes 27 are provided for cooperation with the commutator 24 and are located in brush holders 28 mounted in the end member 13.

In accordance with the present invention, the end members 13 and 14 and the stator core 17 are provided with locating elements 29 and 30 which have a mating cooperation for positioning the end members in a desired relation to each other and to the stator core, and for also positioning the stator core relative to the rotor core 21 for accurately providing a desired small air-gap clearance therebetween. The form of these locating elements and the functioning thereof will presently be described in greater detail.

The end members 13 and 14 are frame or housing members having transverse disc-like end walls 31 and 32 in which the bearings 15 and 16 are centrally mounted and also having substantially cylindrical housing portions 33 and 34 extending toward each other with their adjacent ends in clamping engagement with the ends of the core 17. The end members 13 and 14 are here shown as being also provided with arm projections or brackets 35 and 36 projecting substantially radially therefrom and lying approximately in the same transverse planes as the end walls 31 and 32.

The brackets 35 and 36 are here shown as having an outwardly converging shape and as being provided at the outer end or apex thereof with a pivot portion or eye 37. The brackets 35 and 36 provide a mounting means for the generator 10 by which it can be swingably mounted on a portion of a vehicle engine or other suitable support.

Figure 4:
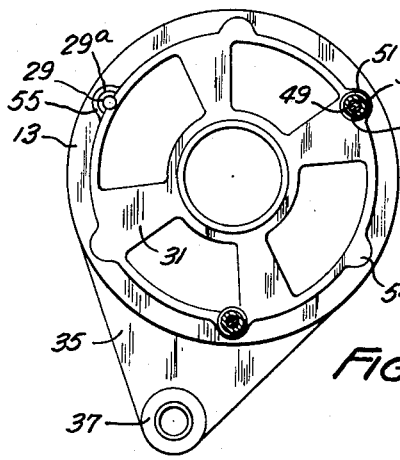
Fig. 4 is an end elevation of one of the end members of the stator and which also shows the cooperation of the locating elements of the core therewith.
Figures 5, 6:
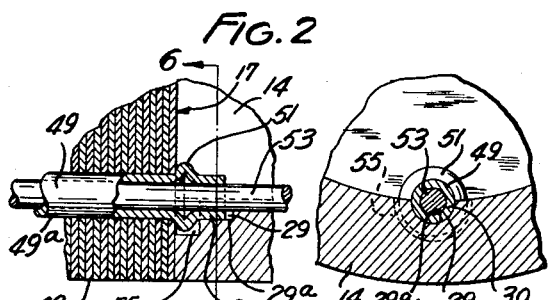
Fig. 5 is a fragmentary sectional view corresponding with a portion of Fig. 1 and illustrating the cooperation between the locating elements of the end members and stator core on a larger scale.
Fig. 6 is a fragmentary sectional view taken on section line 6—6 of Fig. 5.
Figure 7:
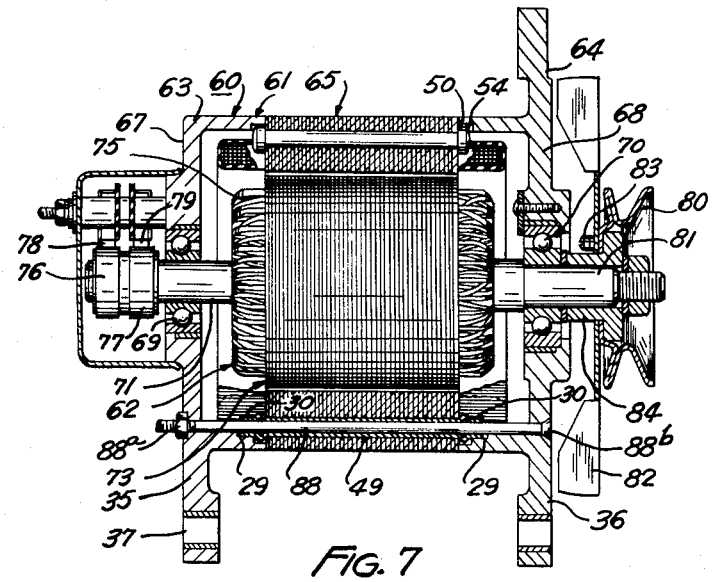
Fig. 7 is a longitudinal section taken through another electrical generator embodying the present invention.
Figure 9:
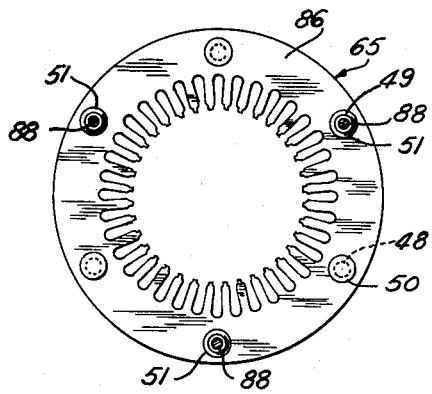
Fig. 9 is an end elevation of the stator core and showing the same with the coils omitted therefrom.
Figure 8:
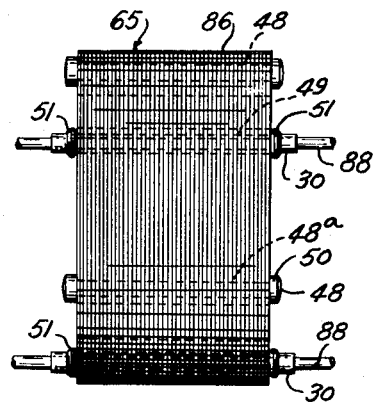
Fig. 8 is a side elevation of the stator core thereof in detached relation.
Figure 10:
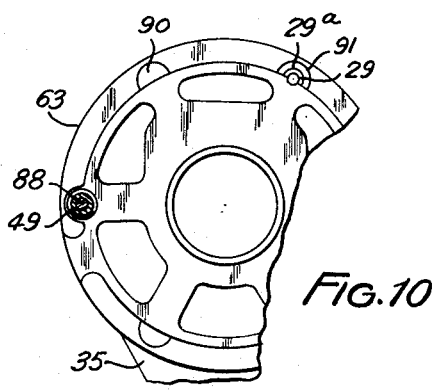
Fig. 10 is a partial end elevation of one of the end members of the stator.
Figure 11:
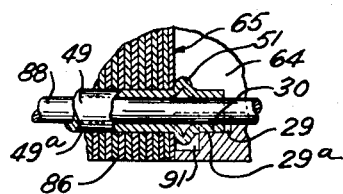
Fig. 11 is a fragmentary sectional view corresponding with a portion of Fig. 7 and illustrating the cooperation between the locating elements of the end members and stator core on a larger scale.

The above-mentioned locating elements 29 of the end members 13 and 14 are here shown as comprising recesses of a substantially half-circular shape formed in the adjacent ends of the housing portions 33 and 34 of these end members. As indicated in Figs. 4 and 6, the recesses 29 of each end member are in a circumferentially spaced relation in an annular series extending around the rotation axis of the shaft 20. The semicircular wall 29a of the recesses 29 forms a concave thrust surface facing radially inwardly toward the rotation axis.

The stator core 17 comprises a plurality of laminations 43 disposed in an axially extending stack. The core 17 also comprises retaining members 48 and 49 extending axially through the laminations 43 and retaining the latter in the stacked relation. The retaining members are disposed in an annular series extending around the rotation axis with the members 48 and 49 in an alternating relation in the series.

The retaining members 48 are here shown as being solid members each having a stem 48a and heads 50 formed by riveted ends of the stem and lying against the end laminations of the core 17. The retaining members 49 are hollow and have a tubular stem 49a and upset or riveted end portions 51 lying against the end laminations of the core 17. End portions of the tubular retaining members 49 project axially beyond the riveted portions 51 to form the locating elements 30 on opposite ends of the core 17. The riveted end portions or heads 50 and 51 of the retaining members 48 and 49 hold the laminations 43 in a clamped relation in the above-mentioned stack.

When the end members 13 and 14 are applied to the stator core 17 during the assembling of the generator 10, the locating elements 30 thus provided on the ends of the core engage in the locating recesses 29 of the end members as a pilot means, such that the end members are rotatably positioned relative to each other and relative to the stator core, and are also positioned relative to each other such that the brackets 35 and 36 and the eye portions 37 of the latter will be in a substantially axially aligned relation. The positioning engagement of the locating projections 30 of the stator core 17 in a mating relation in the recesses 29 of the end members 13 and 14 is clearly shown in the drawings, particularly in Figs. 5 and 6 thereof.

In cases where the bracket arms 35 and 36 are omitted from the end members of the generator 10, the locating recesses and projections 29 and 30 still accomplish an important function in assuring a proper orientation and positioning of the end members 13 and 14, such as for locating the brush holders 28 in proper relation to the field poles 18 during the assembling of the components of the generator. The locating elements 29 and 30 also cause an accurate relative position between the stator core 17 and the rotor core 21 for maintaining a desired close air-gap clearance between these cores.

In completing the assembly of the generator 10, the end members 13 and 14 are connected by bolt-like rods 53 having nut and head elements 53a and 53d thereon. The rods 53 extend through the hollow retaining members 49 of the core 17 and hold the end members 13 and 14 in the above-mentioned clamping engagement with the core. The rods 53 also hold the locating recesses 29 of the end members in aligning cooperation with the locating projections 30 of the core.

The portions of the end members 13 and 14 which engage the stator core 17 are also provided with substantially semicircular clearance recesses 54 and 55. The recesses 54 are in a circumferentially spaced relation so as to lie in an annular series and between the locating recesses 29, and provide clearance spaces to accommodate the riveted portions or heads 50 of the retaining members 48. The recesses 55 are at the same circumferential locations as the locating recesses 29 and are in the nature of counterbores which accommodate the riveted portions or heads 51 of the retaining members 49.

Figs. 7 to 11 inclusive show this invention applied to another form of electrical machine, namely an alternator 60 comprising a stator member 61 and a rotor member 62 operable therein.

The stator 61 comprises a pair of end members 63 and 64 and a laminated stator core 65 disposed between and clampingly engaged by the end members. The end members 63 and 64 have transverse end walls 67 and 68 provided with centrally located antifriction bearings 69 and 70 in which the shaft 71 of the rotor 62 is mounted.

The rotor 62 comprises a laminated rotor core 73 mounted on the shaft 71 and carrying a rotor winding 75 which, in this case, is a field winding. The rotor 62 also comprises a pair of slip rings 76 and 77 connected with the rotor winding 75 and engaged by suitably mounted brushes 78 and 19. The rotor 62 is driven by torque applied thereto through a pulley 80 mounted on the projecting end portion 81 of the shaft 71. A cooling fan 82 is also provided and can be rotatably connected with the shaft by means of screws 83 engaging in the collar 84 of the pulley 80.

The end members 63 and 64 are provided with the same semicircular locating recesses 29 as the end members of the above-described generator 10 and which are located in a circumferentially spaced relation in an annular series with the concave thrust wall 29a thereof facing toward the rotation axis of the shaft 71. Likewise, the end members 63 and 64 are provided with arm projections or brackets 35 and 36 corresponding with the bracket projections of the generator 10 and which have the same location and serve a similar purpose for swingably mounting the alternator 60 on a suitable support.

The stator core 65 comprises an axially extending stack of laminations 86 and retaining members 48 and 49 extending through the laminations and having the same form and purpose as the retaining members of the stator core of the generator 10. That is to say, the retaining members 49 are of the above-described tubular form and have the same riveted end portions 51 and end projections extending beyond the riveted portions and forming locating elements 30.

When the end members 63 and 64 are applied to the stator core 65 during the assembling of the alternator 60, the locating elements 30 on the ends of the core engage in the locating recesses 29 of the end members and produce the desired relative positioning of the parts, as has already been explained above with respect to the components of the generator 10. The end members 63 and 64 are clampingly connected with the stator core 65 by bolt-like rods 88 extending through the hollow retaining members 49 and having nut and head elements 88a, 88b thereon.

The portions of the end members 63 and 64 which engage the ends of the stator core 65 are also provided with clearance recesses 90 and 91 to accommodate the riveted portions or heads 50 and 51 of the retaining members 48 and 49.

From the accompanying drawings and the foregoing detailed description it will now be readily understood that this invention provides a novel electrical machine construction in which the end members and laminated core of the stator of a generator or alternator have locating elements thereon whose mating cooperation positions the end members in a desired relation with respect to each other and with respect to the stator core during the assembling of the components of the machine. It will now also be understood that the locating elements of the stator core are formed by end projections of members extending through the axially stacked laminations of the core. Additionally, it will be understood that this invention contemplates having the locating elements of the stator core formed by projecting end portions of hollow retaining members of the core, such that the connecting rods or bolts for the end members can extend through such hollow retaining members.

Although the novel electrical machine construction of the present invention has been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In an electric generator, a stator comprising a pair of end members and a laminated stator core between said end members, said end members in clamping engagement with said stator core, bearings on said end members, a rotor comprising a shaft rotatably supported by said bearings and having a laminated rotor core on said shaft and rotatable in said stator core about a rotation axis, windings on said stator core and on said rotor core, said end members each having a plurality of circumferentially spaced semicircular locating recesses therein, a plurality of semicircular clearance recesses in the form of counterbores about said locating recesses, said locating recesses each being defined by a concave thrust surface facing radially inwardly toward said rotation axis, said stator core comprising an axially extending stack of laminations and tubular retaining members extending through said laminations and having upset rivet portions engaging opposite ends of said stack, tubular pilot elements projecting axially beyond said upset portions and formed by portions of said retaining members, said pilot elements being engaged in said locating recesses whereby said concave thrust surfaces act on said pilot elements to align said stator core and said end members in their desired relative positions, said rivet portions being received in said clearance recesses, said rivet portions securing said stator laminations together at each of the locations where the alignment is effected by said pilot elements, and clamping rods connecting said end members and extending through said tubular retaining members and their tubular pilot elements.

2. A generator frame structure comprising, a pair of annular end members in a spaced-apart relation on a common axis and having locating recesses thereon, said recesses being on the axially adjacent end portions of said end members and spaced circumferentially around said common axis, an annular core disposed between and clampingly engaged by said end members, said core comprising an axially extending stack of laminations and tubular retaining members extending through said laminations and having upset portions engaging opposite ends of said stack, pilot elements projecting axially beyond said upset portions and formed by end portions of said retaining members, said pilot elements being engaged in said locating recesses, and clamping rods connecting said end members and extending through said retaining members, said locating recesses each being defined by a concave thrust surface facing radially inwardly toward said common axis, whereby said concave thrust surfaces act on said pilot elements to align said annular core and said end members in their desired relative positions having said common axis.

References Cited in the file of this patent
UNITED STATES PATENTS

| | | |
|---|---|---|
| 917,188 | Tirrill | Apr. 6, 1909 |
| 931,620 | Kelley | Aug. 17, 1909 |
| 2,460,063 | Cole | Jan. 25, 1949 |